US010809526B2

United States Patent
Matsuzaki et al.

(10) Patent No.: US 10,809,526 B2
(45) Date of Patent: Oct. 20, 2020

(54) DISPLAY SYSTEM AND MOVABLE OBJECT

(71) Applicant: PANASONIC INTELLECTUAL PROPERTY MANAGEMENT CO., LTD., Osaka (JP)

(72) Inventors: Keiichi Matsuzaki, Kyoto (JP); Michihiro Yamagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 212 days.

(21) Appl. No.: 16/174,681

(22) Filed: Oct. 30, 2018

(65) Prior Publication Data

US 2019/0129170 A1    May 2, 2019

(30) Foreign Application Priority Data

Oct. 31, 2017  (JP) ................................. 2017-210562

(51) Int. Cl.
| | | |
|---|---|---|
| *G02B 27/01* | (2006.01) | |
| *G01C 21/36* | (2006.01) | |
| *B60K 35/00* | (2006.01) | |

(52) U.S. Cl.
CPC .......... *G02B 27/0101* (2013.01); *B60K 35/00* (2013.01); *B60K 2370/1529* (2019.05);
(Continued)

(58) Field of Classification Search
CPC ........ G02B 27/0101; G02B 2027/0123; G02B 27/01; G02B 27/0149; G02B 27/017;
(Continued)

(56) References Cited

U.S. PATENT DOCUMENTS

| | | |
|---|---|---|
| 9,170,411 B2 | 10/2015 | Matsuzaki et al. |
| 10,120,188 B2 | 11/2018 | Matsuzaki et al. |

(Continued)

FOREIGN PATENT DOCUMENTS

WO    WO2017/163292 A1    9/2017

OTHER PUBLICATIONS

U.S. Appl. No. 16/129,894 to Keiichi Matsuzaki et al., which was filed Sep. 13, 2018.

*Primary Examiner* — William R Alexander
*Assistant Examiner* — Alberto J Betancourt
(74) *Attorney, Agent, or Firm* — Greenblum & Bernstein, P.L.C.

(57) ABSTRACT

A display system of one aspect according to the present disclosure includes: a display unit; a first optical member; and a second optical member. The display unit includes a display surface for displaying an image. The first optical member includes a first reflective surface for reflecting rays of light constituting the image. The second optical member includes a second reflective surface for reflecting rays of light reflected from the first reflective surface to form a virtual image in a target space. An angle of view in a length direction of an available area for display of the virtual image with regard to a point of view position for the virtual image is denoted by θ [deg]. A length of the display surface is denoted by W [mm]. W is equal to or greater than a prescribed value given by 12.0×θ−26.6. θ is equal to or greater than 8.0.

20 Claims, 8 Drawing Sheets

(52) U.S. Cl.
CPC .... *B60K 2370/23* (2019.05); *B60K 2370/334* (2019.05); *G01C 21/365* (2013.01); *G02B 2027/0123* (2013.01)

(58) Field of Classification Search
CPC ............ G02B 27/0172; G02B 27/0176; G02B 27/0179; G02B 2027/0125; G02B 2027/0147; B60K 2370/23; B60K 2370/1529; B60K 2370/334; B60K 35/00; B60K 2370/152; B60K 2370/1526; B60K 2370/1531; B60K 2370/177; B60K 2370/167; B60K 2370/166; B60K 2370/164; B60K 2370/154; B60K 2370/155; G01C 21/365; H04N 13/044; H04N 5/7491; B60R 2300/205
USPC ...... 359/13–14, 629–633; 345/7–9; 348/115; 349/11
See application file for complete search history.

(56) References Cited

U.S. PATENT DOCUMENTS

| | | | |
|---|---|---|---|
| 2016/0195719 A1* | 7/2016 | Yonetani | G02B 27/0101 359/631 |
| 2017/0329134 A1* | 11/2017 | Onda | G02B 27/0101 |
| 2018/0015876 A1 | 1/2018 | Yamagata et al. | |
| 2018/0052322 A1* | 2/2018 | Kubota | G02B 27/0101 |
| 2019/0049726 A1* | 2/2019 | Nomura | G02B 27/0101 |
| 2019/0116344 A1* | 4/2019 | Nguyen | G02B 27/0101 |
| 2019/0196188 A1* | 6/2019 | Hirata | G02B 27/0101 |
| 2019/0265472 A1* | 8/2019 | Sugiyama | G02B 27/0101 |
| 2019/0346675 A1* | 11/2019 | Yoshimura | G02B 27/0101 |

* cited by examiner

DISPLAY SYSTEM AND MOVABLE OBJECT

CROSS-REFERENCE TO RELATED APPLICATION

The present application is based upon and claims the benefit of priority of Japanese Patent Application No. 2017-210562, filed on Oct. 31, 2017.

TECHNICAL FIELD

The present disclosure generally relates to display systems and movable objects and particularly to a display system and a movable object for formation of a virtual image in a target space.

BACKGROUND ART

Document 1 (WO 2017/163292 A1) discloses a head-up display device for projecting image light onto a front wind shield of a vehicle to produce a virtual image which is visible for a driver as if it is in front of the front wind shield. The head-up display device includes a display element, a movable mirror, a movable unit, a first mirror, and a second mirror. The movable mirror reflects display light emitted from the display element toward the first mirror. The first mirror reflects display light reflected from the movable mirror toward the second mirror. The second mirror reflects display light reflected from the first mirror and concentrates it to make it go to the front wind shield.

In the field of the head-up display (display system), there may be a demand to display a virtual image with a larger size. In this regard, increasing optical magnification determined by the first mirror (first optical member) and the second mirror (second optical member) may cause an increase in an angle of view (field angle) for a visible position, and then a size of a virtual image can be increased. However, using an optical system with larger optical magnification may cause an increase in a size of the head-up display. Therefore, it may not satisfy another demand to downsize the head-up display as such.

An object of the present disclosure would be to propose a display system and a movable object which can be downsized yet a virtual image can have a larger size.

SUMMARY

A display system of one aspect according to the present disclosure includes: a display unit; a first optical member, and a second optical member. The display unit includes a display surface for displaying an image. The first optical member includes a first reflective surface for reflecting rays of light constituting the image. The second optical member includes a second reflective surface for reflecting rays of light reflected from the first reflective surface to form a virtual image in a target space. An angle of view in a length direction of an available area for display of the virtual image with regard to a point of view position for the virtual image is denoted by $\theta$ [deg]. A length of the display surface is denoted by W [mm]. W is equal to or greater than a prescribed value given by $12.0 \times \theta - 26.6$. $\theta$ is equal to or greater than 8.0.

A display system of another aspect according to the present disclosure includes: a display unit; a first optical member, and a second optical member. The display unit includes a display surface for displaying an image. The first optical member includes a first reflective surface for reflecting rays of light constituting the image. The second optical member includes a second reflective surface for reflecting rays of light reflected from the first reflective surface to form a virtual image in a target space. An angle of view in a length direction of an available area for display of the virtual image with regard to a point of view position for the virtual image is denoted by $\theta$ [deg]. A maximum amount of sag of the first reflective surface is denoted by S10 [mm]. A maximum amount of sag of the second reflective surface is denoted by S20 [mm]. A square root of sum of squares of S10 and S20 is denoted by S. S is equal to or larger than $4.0 \times \theta - 9.2$ and is equal to or smaller than $6.0 \times \theta - 13.8$. $\theta$ is equal to or greater than 8.0.

A movable object of another aspect according to the present disclosure includes: a movable object body; and any one of the above display systems installed in the movable object body.

DETAILED DESCRIPTION

1. Embodiments 1.1 Overview

Figure 1:
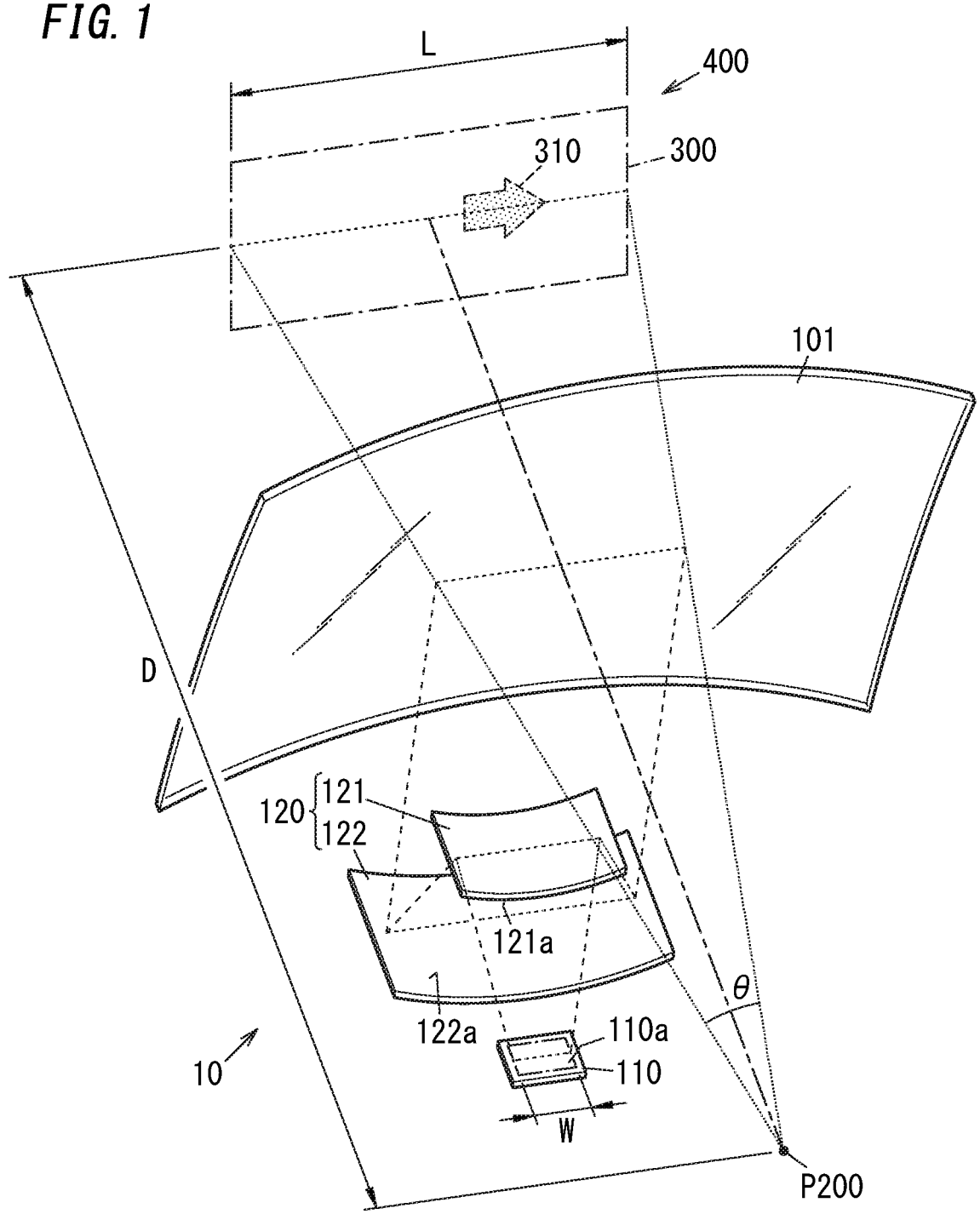
FIG. 1 is a conceptual view of a display system of one embodiment.

FIG. 1 shows a display system 10. The display system 10 includes a display unit 110, a first optical member 121, and a second optical member 122. The display unit 110 includes a display surface 110a for displaying an image. The first optical member 121 includes a first reflective surface 121a for reflecting rays of light constituting the image. The second optical member 122 includes a second reflective surface 122a for reflecting rays of light reflected from the first reflective surface 121a to form a virtual image 310 in a target space 400.

The display system 10 satisfies a first condition described below. In the first condition, an angle of view in a length direction of an available area 300 for display of the virtual image 310 with regard to a point of view position P200 for the virtual image 310 is denoted by $\theta$ [deg] and a length of the display surface 110a is denoted by W [mm]. In this regard, W is equal to or greater than a prescribed value given by $12.0 \times \theta - 26.6$, and $\theta$ is equal to or greater than 8.0.

Increasing an optical magnification of an optical system including the first optical member 121 and the second optical member 122 may be one of methods for increasing the angle of view $\theta$. In this case, in a point of view of optical design, generally, an aberration of the optical system may increase with an increase in the angle of view. Therefore, as more difficult is design for reducing the aberration as increases the angle of view. Meanwhile, in a point of view of correction of distortion, remaining distortion may increase with an increase in the angle of view. In contrast, to increase the angle of view θ, the first condition increases the display surface 110a to enable display of a larger image to increase the angle of view θ. Therefore, an increase in the optical magnification of the optical system can be reduced, and thus increases in sizes of the first optical member 121 and the second optical member 122 can be reduced. As a result, although the display unit 110 may increase in its size, the display system 10 may be downsized as a whole. Hence, the display system 10 can be downsized yet the virtual image can have a larger size. In this regard, only a length W of the display surface 110a is taken into consideration and a width of the display surface 110a is not taken into consideration because the width of the display surface 110a may give less influence on the size of the display system 10 than the length W.

Additionally, the display system 10 satisfies a second condition described below. In the second condition, an angle of view in a length direction of an available area 300 for display of the virtual image 310 with regard to a point of view position P200 for the virtual image 310 is denoted by θ [deg]. Further, a maximum amount of sag of the first reflective surface 121a is denoted by S10 [mm] (see FIG. 2) and a maximum amount of sag of the second reflective surface 122a is denoted by S20 [mm] (see FIG. 3), and a square root of sum of squares of S10 and S20 is denoted by S. In this regard, S is equal to or larger than 4.0×θ−9.2 and is equal to or smaller than 6.0×θ−13.8, and θ is equal to or greater than 8.0. In the second condition, to increase the angle of view θ, the maximum amounts of sag of the first optical member 121 and the second optical member 122 are not set separately, but are set collectively with the first optical member 121 and the second optical member 122 considered as one part. Accordingly, it is possible to reduce increases in a size of a space occupied by the first optical member 121 and the second optical member 122. As a result, the display system 10 may be downsized as a whole. Hence, the display system 10 can be downsized yet the virtual image can have a larger size.

1.2 Details

Figure 4:
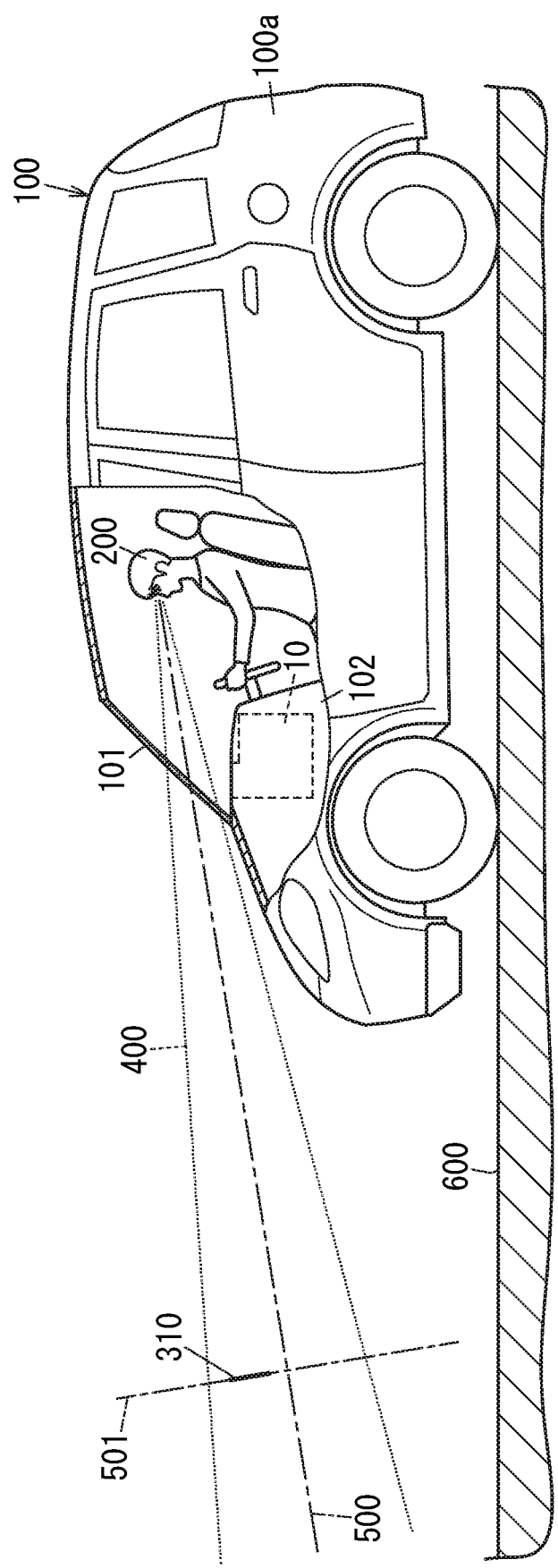
FIG. 4 is a conceptual view of a movable object (automobile) including the display system.

FIG. 4 shows an automobile 100 exemplifying a movable object. The automobile 100 includes an automotive body 100a exemplifying a movable object body, and the display system 10 installed in the automotive body 100a. The display system 10 is used in the automobile 100 as a head-up display (HUD).

The display system 10 is installed in an interior of the automobile 100 to project an image onto a wind shield 101 of the automotive body (movable object body) 100a of the automobile 100 from below. In an example shown in FIG. 4, the display system 10 is placed inside a dashboard 102 below the wind shield 101. When an image is projected from the display system 10 onto the wind shield 101, the image reflected from the wind shield 101 serving as a reflective member may be visually perceived by a user 200 (driver).

Figure 5:
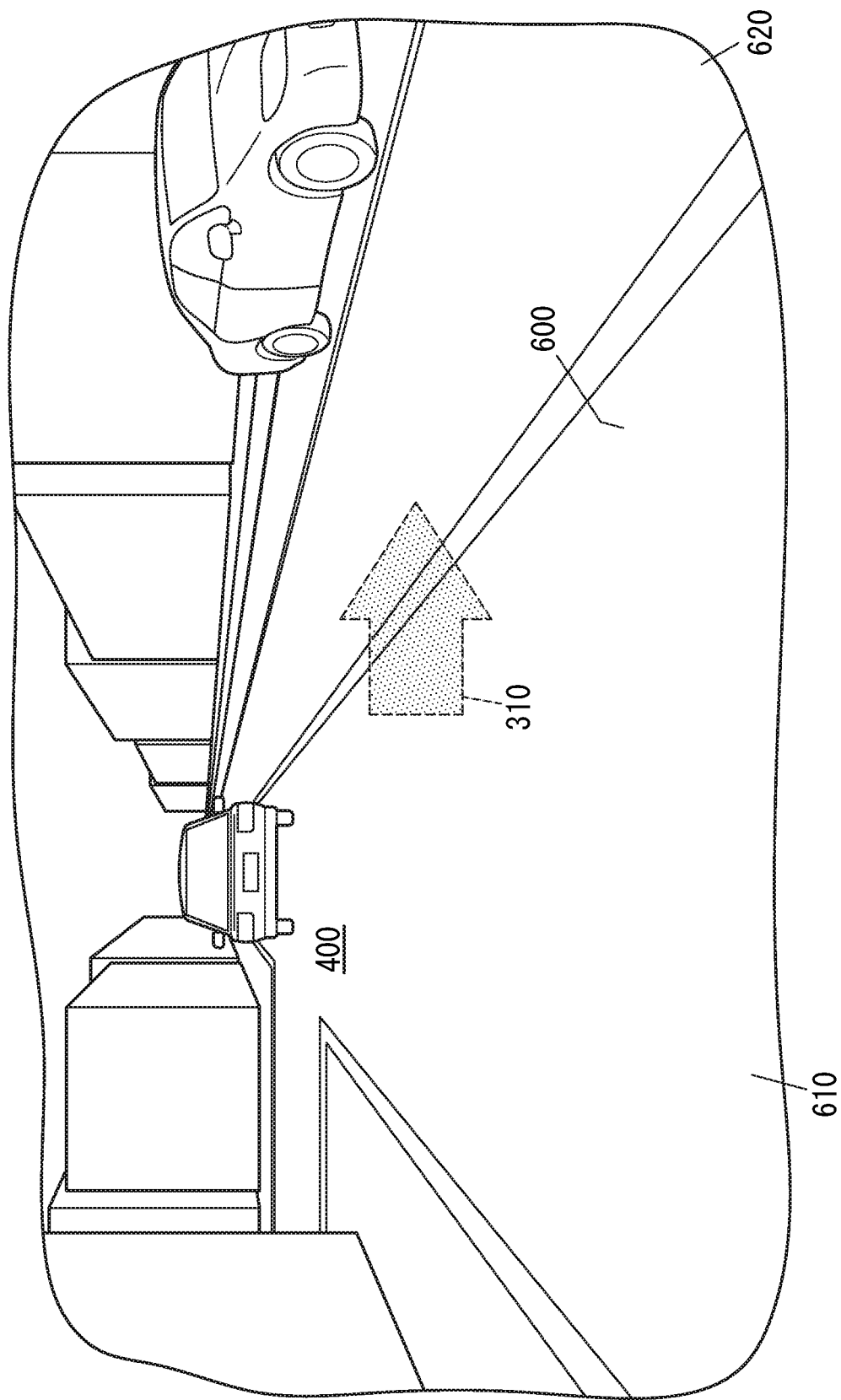
FIG. 5 is a conceptual view of a field of view of a user using the display system.

The display system 10 allows the user 200 to visually perceive a virtual image 310 formed in a target space 400 positioned in front of (outside) the automobile 100 over the wind shield 101. In this disclosure, a "virtual image" means an image which is formed by diffused rays of light caused when light emitted from the display system 10 is diffused by a reflective member such as the wind shield 101 and appears as if a real object. Therefore, as shown in FIG. 5, the user 200 driving the automobile 100 can see the virtual image 310 which is formed by the display system 10 and overlaps with a real space spreading in front of the automobile 100. Accordingly, the display system 10 can display the virtual image 310 indicating various driving assist information such as vehicle speed information, navigation information, pedestrian information, forward vehicle information, lane departure information, and vehicle condition information, and can allow the user 200 to visually perceive it. In FIG. 5, the virtual image 310 indicates navigation information exemplified by an arrow for lane change. Accordingly, when the user 200 trains his or her eyes on a space in front of the wind shield 101, the user 200 can visually obtain the driving assist information by slight movement of a line of his or her sight.

In the display system 10, the virtual image 310 created in the target space 400 is present within an imaginary surface 501 across an optical axis 500 of the display system 10. In the present embodiment, the optical axis 500 extends along a road surface 600 in front of the automobile 100 in the target space 400 in front of the automobile 100. And, the imaginary surface 501 where the virtual image 310 is created is almost perpendicular to the road surface 600. For example, when the road surface 600 is a horizontal surface, the virtual image 310 may be seen as if it extends along a vertical surface.

Figure 6:
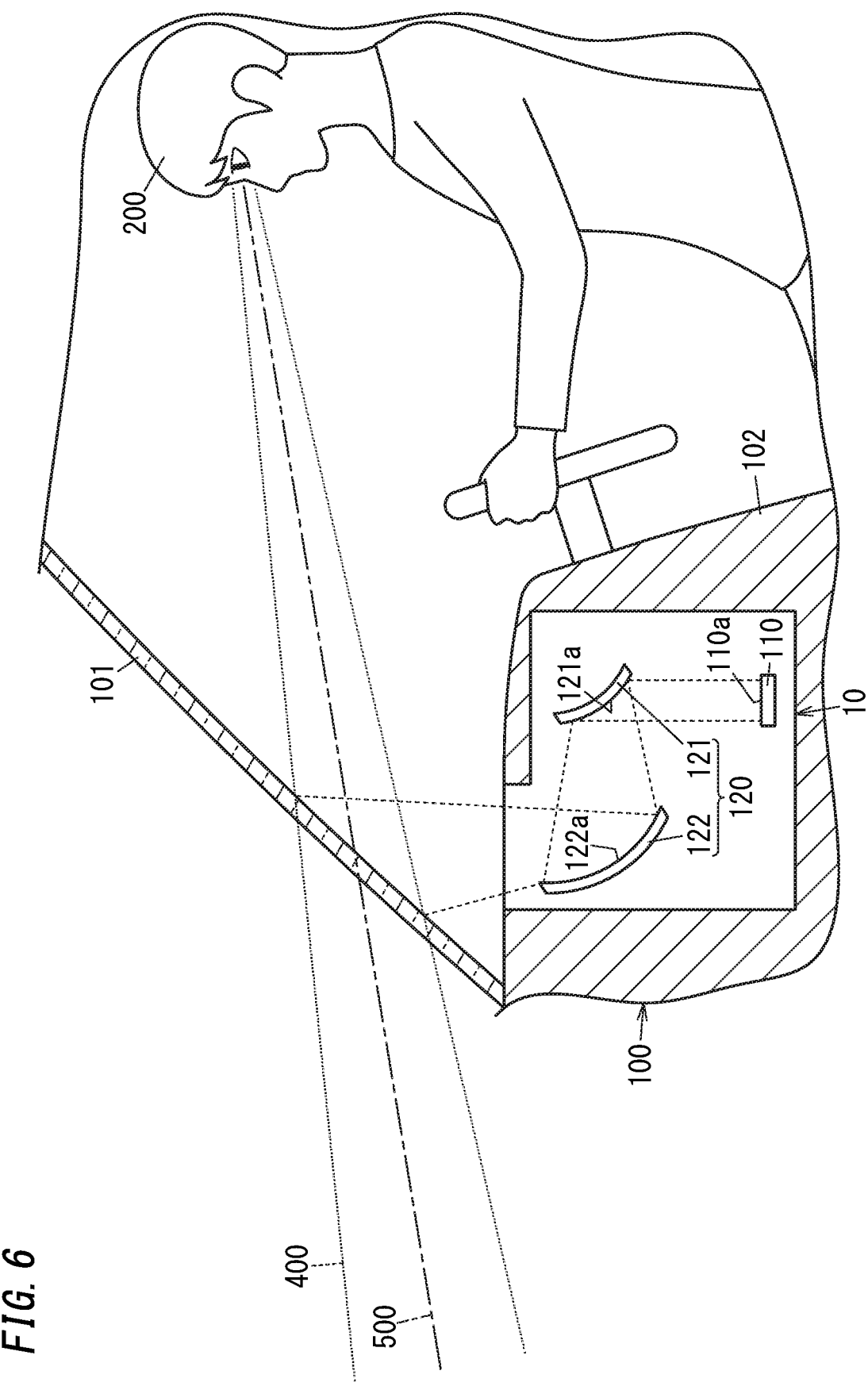
FIG. 6 is a conceptual view for illustration of operation of the display system.

As shown in FIG. 6, the display system 10 includes a display unit 110 and a projection unit 120.

The display unit 110 is used to display an image to be shown in the target space 400 as the virtual image 310. As shown in FIG. 1, the display unit 110 includes a display surface 110a for displaying an image. In the present embodiment, the display surface 110a is a rectangular region in a surface of the display unit 110. In a point of view of downsizing the display system 10, it may be preferable that the display surface 110a occupies almost an entire surface of the display unit 110. In the present embodiment, the display unit 110 includes a liquid crystal display.

The projection unit 120 is used to project the virtual image 310 corresponding to an image (image displayed on the display surface 110a of the display unit 110) toward the target space 400. As shown in FIG. 1, the projection unit 120 includes a first optical member 121 and a second optical member 122. In other words, the projection unit 120 includes an optical system constituted by the first optical member 121 and the second optical member 122.

The first optical member 121 reflects light from the display unit 110 toward the second optical member 122. As shown in FIG. 1, the first optical member 121 includes a first reflective surface 121a for reflecting rays of light constituting an image. The first reflective surface 121a has a larger size than the display surface 110a. The first optical member 121 is placed relative to the display unit 110 so that the first reflective surface 121a reflects an entire image on the display surface 110a of the display unit 110. In the present embodiment, the first reflective surface 121a includes a convex surface. Thus, rays of light emitted from the image displayed on the display surface 110a of the display unit 110 strike the second optical member 122 with angles of divergence increased. In other words, rays of light constituting the image are diffused by the first reflective surface 121a and then strike the second reflective surface 122a. Note that, the first reflective surface 121a may be a spherical surface or an aspherical surface (free-form surface). Especially, the first reflective surface 121a may be an aspherical surface designed to correct distortion of an image. Note that, in the present embodiment, the first reflective surface 121a is a partial or entire region of the surface of the first optical member 121. In summary, the first reflective surface 121a may be a region (effective region) which belongs to the surface of the first optical member 121 and actually reflects rays of light constituting an image. The first optical member 121 may preferably have such a size that the virtual image 310 is shown in a complete form even when a position of a point of view of the user 200 moves within a space where the position of the point of view is assumed to be present (e.g., an eye box).

The second optical member 122 reflects light from the first optical member 121 toward the wind shield 101. The second optical member 122 projects an image formed (displayed) on the display surface 110a of the display unit 110 onto the wind shield 101, thereby forming the virtual image 310 in the target space 400. As shown in FIG. 1, the second optical member 122 includes the second reflective surface 122a for reflecting rays of light reflected from the first reflective surface 121a to form the virtual image 310 in the target space 400. The second reflective surface 122a has a larger size than the first reflective surface 121a. The second optical member 122 is placed relative to the first optical member 121 to reflect a complete image on the display surface 110a of the display unit 110. In the present embodiment, the second reflective surface 122a includes a concave surface. Note that, the second reflective surface 122a may be a spherical surface or an aspherical surface (free-form surface). Especially, the second reflective surface 122a may be an aspherical surface designed to correct distortion of an image. Note that, in the present embodiment, the second reflective surface 122a is a partial or entire region of the surface of the second optical member 122. In summary, the second reflective surface 122a may be a region (effective region) which belongs to the surface of the second optical member 122 and actually reflects rays of light constituting an image. The second optical member 122 may preferably have such a size that the virtual image 310 is shown in a complete form even when a position of a point of view of the user 200 moves within a space where the position of the point of view is assumed to be present (e.g., an eye box).

As described above, the display system 10 satisfies the first condition and the second condition. To satisfy the first condition, satisfying the following relational expressions (1) and (2) is required. To satisfy the second condition, satisfying the following relational expressions (1) and (3) is required. Therefore, satisfying the relational expressions (1), (2), and (3) means satisfying the first condition and the second condition both.

[FORMULA 1]

$$\theta \geq 8.0 \quad (1)$$

$$W \geq 12.0 \times \theta - 26.6 \quad (2)$$

$$4.0 \times \theta - 9.2 \leq S \leq 6.0 \times \theta - 13.8 \quad (3)$$

Regarding the relational expression (1), $\theta$ denotes an angle of view (view angle) in a length direction of the available area 300 for display of the virtual image 310 with regard to the point of view position P200 (see FIG. 1) for the virtual image 310 and is expressed in unit of [deg]. The available area 300 for display is defined by a size of the virtual image 310 when an image is displayed on a whole of the display surface 110a. In the present embodiment, length directions of the display surface 110a, the first reflective surface 121a, and the second reflective surface 122a are the same direction. And a length direction of an image displayed on the display surface 110a is same as the length direction of the available area 300 for display of the virtual image 310.

The angle of view $\theta$ is a parameter for determining a length L [m] of the available area 300 for display of the virtual image 310 (see FIG. 1). When a display distance defined as a distance between the point of view position P200 and the available area 300 for display is denoted by D [m], the length L of the available area 300 for display is given by 2D tan $\theta$. Therefore, as increases the angle of view $\theta$, as becomes larger the virtual image 310 visible from the point of view position P200. Note that, the point of view position P200 may be a center position of the space where the virtual image 310 is visible (i.e., an eye box). Further, in the display system 10, the display distance D may be preferably equal to or larger than 7 m, or more preferably equal to or larger than 10 m.

Regarding the relational expression (2), W denotes a length of the display surface 110a and is expressed in unit of [mm]. The length of the display surface 110a means an effective length of the display surface 110a rather than a length of the display surface 110a as such. In this regard, the effective length of the display surface 110a means a length of a region used to display an image in the display surface 110a. For example, when an image is displayed on a partial region of the display surface 110a, a length of this partial region means the effective length of the display surface 110a.

Figure 7:
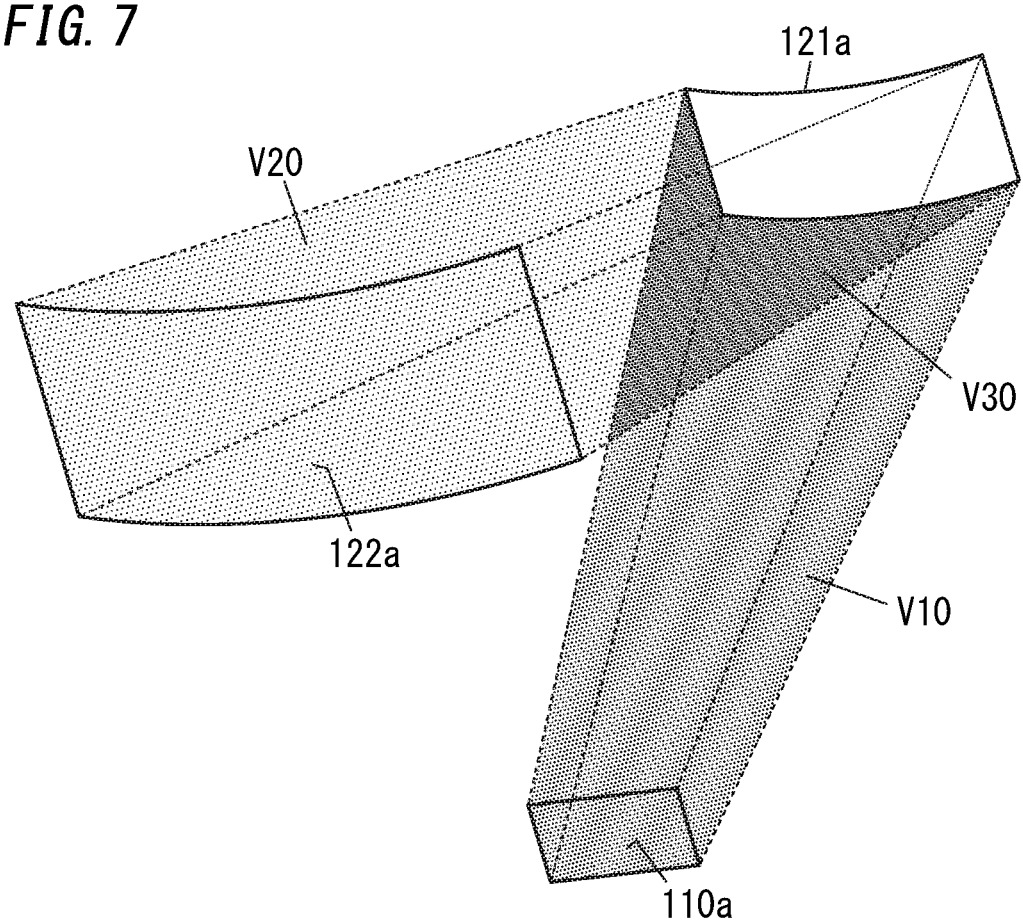
FIG. 7 is an explanatory view for illustration of how to determine a size of the display system.

The relational expression (2) is determined based on a relation between a minimum value Vmin of the size of the display system 10 and the length W of the display surface 110a, for each angle of view $\theta$. As shown in FIG. 7, the size of the display system 10 is determined based on a volume of a space V10 between the display surface 110a and the first reflective surface 121a and a volume of a space V20 between the first reflective surface 121a and the second reflective surface 122a. In more detail, a value obtained by subtracting a volume of an overlap V30 between the space V10 and the space V20 (see FIG. 7) from the sum of the volume of the space V10 and the volume of the space V20 is used as an evaluation value for the size of the display system 10. The minimum value Vmin of the size of the display system 10 means a minimum value of the evaluation value determined by changing various parameters of the display system 10 in relation to the angle of view $\theta$ and the length of the display surface 110a.

Figure 8:
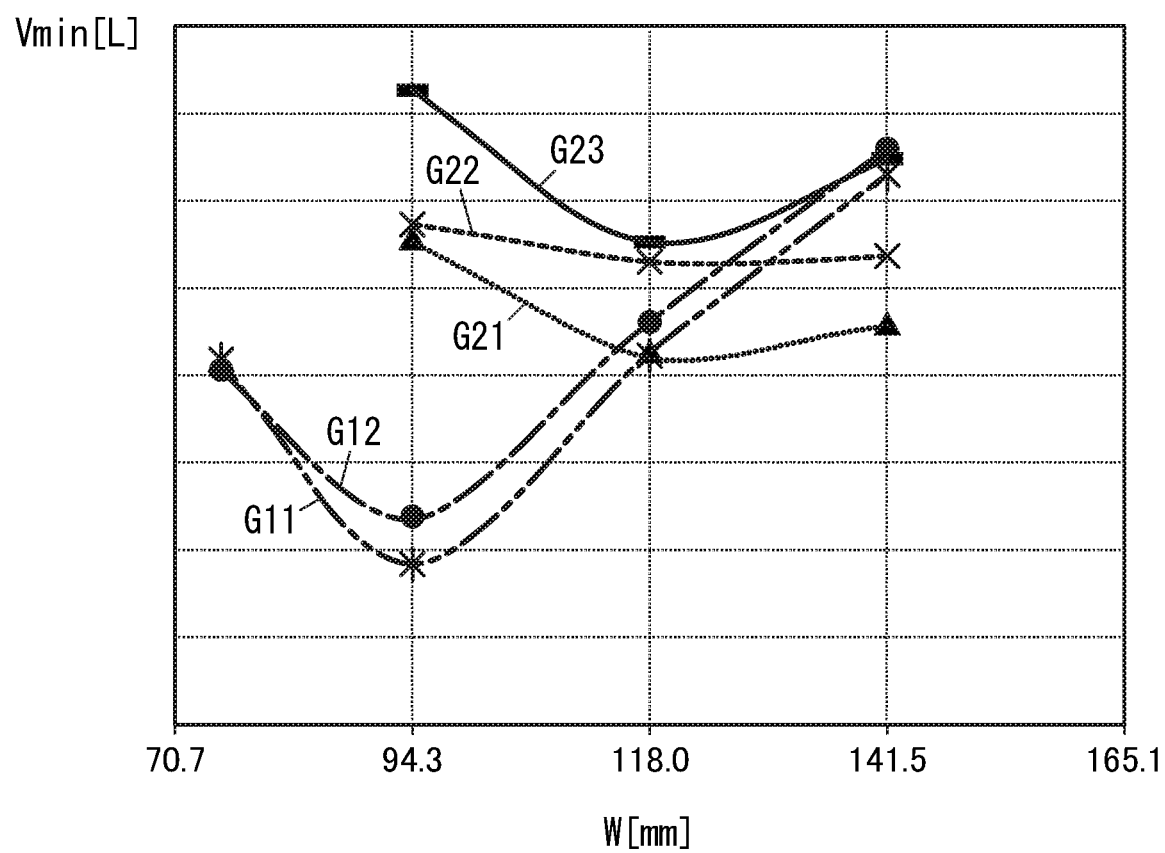
FIG. 8 is a graph indicating a relationship between a minimum value of the size of the display system and a length of a display surface.

FIG. 8 shows results of calculation of the minimum value Vmin of the size of the display system 10 in relation to the length W of the display surface 110a, for each angle of view $\theta$. In summary, FIG. 8 is a graph showing a relation between the minimum value Vmin of the size of the display system 10 and the length W of the display surface 110a. In FIG. 8, a curved line G11 represents an example where the angle of view $\theta$ is 8.0 [deg] and the display distance D is 20 [m]. A curved line G12 represents an example where the angle of view $\theta$ is 8.0 [deg] and the display distance D is 40 [m]. A curved line G21 represents an example where the angle of view $\theta$ is 10.0 [deg] and the display distance D is 10 [m]. A curved line G22 represents an example where the angle of view $\theta$ is 10.0 [deg] and the display distance D is 20 [m]. A curved line G23 represents an example where the angle of view $\theta$ is 10.0 [deg] and the display distance D is 40 [m].

According to the relational expression (2), a lower limit of W is given by $12.0 \times \theta - 26.6$. This is determined based on the relation between the minimum value Vmin of the size of the display system 10 and the length W of the display surface 110a, for each angle of view $\theta$ as shown in FIG. 8, and also is determined in a range where distortion can be reduced by an electronic correction process. Distortion remaining after correction may be different for each eye point. In a case where a difference in remaining distortion between eye points corresponding to both eyes is too large, a difference of inclinations of images seen by individual left and right eyes when the virtual image 310 is viewed from the point of view position P200 may also become too large. Therefore, the virtual image 310 may be seen doubly. Further, fatigue of the user 200 looking at the virtual image 310 may increase easily. For example, the electronic correction process may be a process of preliminarily changing an image displayed on the display surface 110a to reduce such distortion. Therefore, when W does not satisfies the relational expression (2), which means W is smaller than the prescribed value given by 12.0×θ−26.6, it may be difficult to reduce the distortion effectively. Eye-friendly display of the virtual image 310 may not be achieved.

In contrast, it is expected that effects of reducing distortion will be increased with an increase in W. However, an increase in W may cause an increase in the size of the display system 10. In view of this, in consideration of the relation between the minimum value Vmin of the size of the display system 10 and the length W of the display surface 110a, for each angle of view θ as shown in FIG. 8, the display system 10 further satisfies the following relational expression (4).

[FORMULA 2]

$$W \leq 1.1 \times (12.0 \times \theta - 26.6) \tag{4}$$

In summary, W is 1.1 times as large as the prescribed value (lower limit) given by 12.0×θ−26.6, or less. In other words, an upper limit of W is 1.1 times as large as the lower limit. When W satisfies the relational expressions (2) and (4), effects of reducing distortion can be realized yet the display system 10 can be downsized.

As described above, the various parameters of the display system 10 are used to calculate the minimum value Vmin of the size of the display system 10. The various parameters of the display system 10 include a maximum amount of sag of the first reflective surface 121a and a maximum amount of sag of the second reflective surface 122a.

Figure 2:
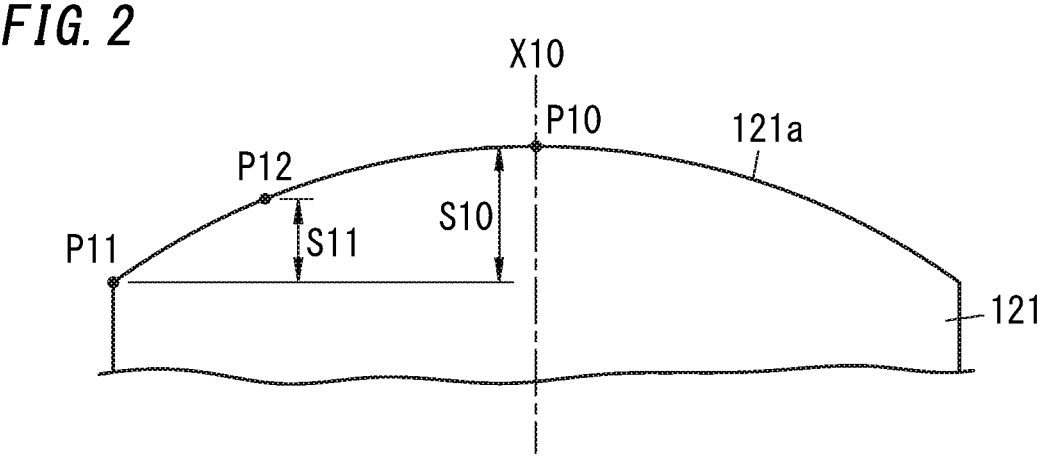
FIG. 2 is an explanatory view for illustration of an amount of sag of a first optical member of the display system.

The maximum amount of sag of the first reflective surface 121a may be defined by a maximum amount of sag in the length direction of the first reflective surface 121a. FIG. 2 shows S10 which indicates the maximum amount of sag in the length direction of the first reflective surface 121a. First, an amount of sag S11 in the length direction of the first reflective surface 121a is given by a distance, along an optical axis X10 of the first reflective surface 121a, between a reference position P11 and a selected position P12. The reference position P11 is a position furthest from the optical axis X10 of the first reflective surface 121a. The amount of sag S11 is maximized when the selected position P12 is located at a position P10 on the optical axis X10 of the first reflective surface 121a. In FIG. 2, only for facilitating understanding of amounts of sag, the first optical member 121 is schematically illustrated.

Figure 3:
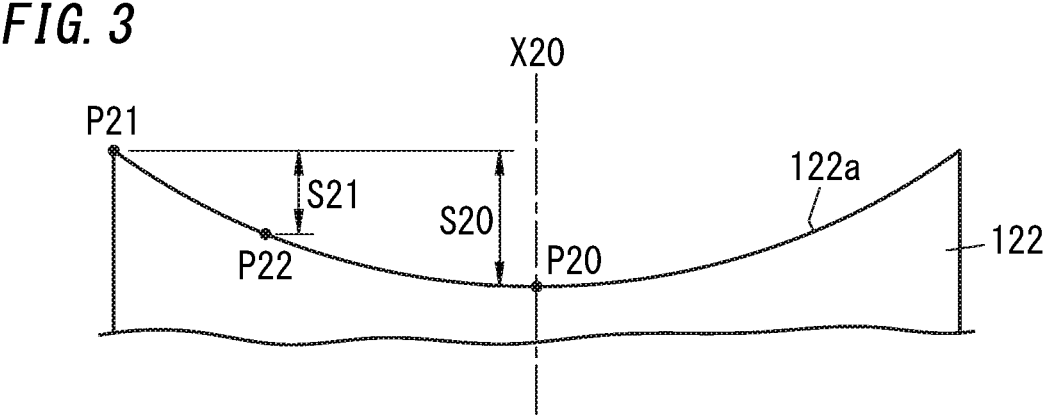
FIG. 3 is an explanatory view for illustration of an amount of sag of a second optical member of the display system.

The maximum amount of sag of the second reflective surface 122a may be defined by a maximum amount of sag in the length direction of the second reflective surface 122a. FIG. 3 shows S20 which indicates the maximum amount of sag in the length direction of the second reflective surface 122a. First, an amount of sag S21 in the length direction of the second reflective surface 122a is given by a distance, along an optical axis X20 of the second reflective surface 122a, between a reference position P21 and a selected position P22. The reference position P21 is a position furthest from the optical axis X20 of the second reflective surface 122a. The amount of sag S21 is maximized when the selected position P22 is located at a position P20 on the optical axis X20 of the second reflective surface 122a. In FIG. 3, only for facilitating understanding of amounts of sag, the second optical member 122 is schematically illustrated.

The relational expression (3) can be derived from a relation between the angle of view θ and a set of the maximum amount of sag S10 of the first reflective surface 121a and the maximum amount of sag S20 of the second reflective surface 122a which make the size of the display system 10 have the minimum value Vmin. In this relational expression (3), S is a square root of sum of squares of the maximum amount of sag S10 of the first reflective surface 121a and the maximum amount of sag S20 of the second reflective surface 122a. In summary, S is represented by $(S10^2 + S20^2)^{1/2}$. In other words, the relational expression (3) is derived based on a relation between the minimum value Vmin of the size of the display system 10 and S, for each angle of view θ.

According to the relational expression (3), the upper limit of S is given by 6.0×θ−13.8. When S exceeds the upper limit, distortion of the virtual image 310 may increase and this may reduce visibility of the virtual image 310. According to the relational expression (3), the lower limit of S is given by 4.0×θ−9.2. When S is smaller than the lower limit, the size of the display system 10 tends to increase with change in S.

As described above, the display system 10 satisfies the first condition (the relational expressions (1) and (2)). Thus, it is possible to reduce increases in the sizes of the first optical member 121 and the second optical member 122. Further, the display system 10 satisfies the second condition (the relational expressions (1) and (3)). Thus, it is possible to reduce an increase in an entire space occupied by the first optical member 121 and the second optical member 122. Consequently, the display system 10 can be downsized yet the virtual image has a larger size.

In the present embodiment, the display system 10 shows the virtual image 310 overlaid on a front landscape in a field of view of the user 200 by use of augmented reality (AR) techniques. In such a case, the angle of view in a horizontal direction of the virtual image 310 from the point of view position P200 (corresponding to the angle of view θ in the length direction of the available area 300 for display of the virtual image 310) may preferably be as large as possible. Especially, in application of the display system 10 to a head-up display, the virtual image 310 is assumed to be used to show guides for right turn, left turn, and lane change to the user 200. For example, the virtual image 310 provides visual impression as if an arrow indicating a direction of travel is described on a road. As shown in FIG. 5, such an arrow may be shown to extend from a current traffic lane 610 to a next traffic lane 620. Therefore, no problem to display such an arrow may occur when a destination of lane change is relatively still far from the system. However, if the angle of view in the horizontal direction is small, showing the arrow crossing from the lane 610 to the lane 620 becomes very difficult when the destination comes near the system to an extent. Accordingly, to enable the arrow crossing from the lane 610 to the lane 620 to be shown even if the destination is near the system, the angle of view θ may preferably be large to an extent. The angle of view θ may preferably be equal to or larger than 8 degrees, and more preferably be equal to or larger than 9 degrees. In contrast, when the angle of view θ is increased, it may be necessary to increase in the amount of sag S11 (the maximum amount of sag S10) of the first optical member 121 and in the amount of sag S21 (the maximum amount of sag S20) of the second optical member 122. No problem may occur until the angle of view θ does not exceed 13 degrees. However, when the angle of view θ exceeds 14 degrees, designing the first optical member 121 and the second optical member 122 becomes difficult. Accordingly, it may be desirable that the angle of view θ is equal to or smaller than 14 degrees.

2. Variations

Embodiments of the present disclosure are not limited to the above embodiment. The above embodiment may be modified in various ways in accordance with design or the like as it can achieve the object of the present disclosure. Hereinafter, variations of the above embodiment are listed.

For example, the display system 10 may not satisfy all the relational expressions (1) to (4). It may be sufficient that the display system 10 may satisfy either a combination of the relational expressions (1) and (2) (the first condition) or a set of the relational expressions (1) and (3) (the second condition).

For example, the display unit 110 may not be limited to a liquid crystal display. For example, the display unit 110 may be a display device other than a liquid crystal display, such as an organic EL display. Alternatively, the display unit 110 may not be a display device as such. For example, the display unit 110 may be a system including a projector and a screen on which an image is projected by the projector, or a system including a laser scanning device and a screen on which an image is displayed by scanning a laser beam by the laser scanning device. Alternatively, the display unit 110 may be a screen as such, or may be a flat mirror for reflecting an image from a display device. In summary, the display unit 110 may display an intermediate image. In the display unit 110, the display surface 110a may not be always rectangular, but may have two dimensions in orthogonal directions one of which is longer than the other.

For example, regarding the projection unit 120, the first optical member 121 and the second optical member 122 may be modified in their shapes. For example, what is important for the first optical member 121 is the shape of the first reflective surface 121a, and accordingly shapes of other parts may be designed relatively freely. Likewise, what is important for the second optical member 122 is the shape of the second reflective surface 122a, and accordingly shapes of other parts may be designed relatively freely. Additionally, the shapes of the first reflective surface 121a and the second reflective surface 122a may be designed appropriately depending on the display surface 110a.

For example, the display system 10 may not be limited to configurations for forming the virtual image 310 in the target space 400 set on a front side in relation to a direction of travel of the automobile 100, but may be configured to form the virtual image 310 on a lateral side, a back side, an upper side, or the like in relation to the direction of travel of the automobile 100. The projection unit 120 may include a relay optical system for forming an intermediate image but such a relay optical system may be optional.

For example, the display system 10 may not be limited to a head-up display used in the automobile 100 but may be applied to a movable object other than the automobile 100, such as two wheels, trains, planes, construction machines, and ships. Alternatively, the display system 10 may not be limited to being used in a movable object, but may be used in amusement facilities, for example.

3. Aspects

As obviously understood from the above embodiment and variations, the present disclosure contains the following aspects. Hereinafter, to clearly indicate relationship between the following aspects and the embodiments, reference signs in parentheses are added.

A display system (10) of a first aspect includes: a display unit (110); a first optical member (121); and a second optical member (122). The display unit (110) includes a display surface (110a) for displaying an image. The first optical member (121) includes a first reflective surface (121a) for reflecting rays of light constituting the image. The second optical member (122) includes a second reflective surface (122a) for reflecting rays of light reflected from the first reflective surface (121a) to form a virtual image (310) in a target space (400). An angle of view in a length direction of an available area (300) for display of the virtual image (310) with regard to a point of view position (P200) for the virtual image (310) is denoted by θ [deg]. A length of the display surface (110a) is denoted by W [mm]. W is equal to or greater than a prescribed value given by 12.0×θ−26.6. θ is equal to or greater than 8.0. The first aspect enables downsizing yet a virtual image (310) can have a larger size.

A display system (10) of a second aspect would be realized in combination with the first aspect. In the second aspect, W is 1.1 times as large as the prescribed value or less. The second aspect enables downsizing yet a virtual image (310) can have a larger size.

A display system (10) of a third aspect would be realized in combination with the first or second aspect. In the third aspect, θ is equal to or larger than 9.0. The third aspect enables downsizing yet a virtual image (310) can have a larger size.

A display system (10) of a fourth aspect would be realized in combination with any one of the first to third aspects. In the fourth aspect, θ is equal to or smaller than 14.0. The fourth aspect enables downsizing yet a virtual image (310) can have a larger size.

A display system (10) of a fifth aspect would be realized in combination with any one of the first to fourth aspects. In the fifth aspect, a maximum amount of sag of the first reflective surface (121a) is denoted by S10 [mm]. A maximum amount of sag of the second reflective surface (122a) is denoted by S20 [mm]. A square root of sum of squares of S10 and S20 is denoted by S. S is equal to or larger than 4.0×θ−9.2 and is equal to or smaller than 6.0×θ−13.8. The fifth aspect enables downsizing yet a virtual image (310) can have a larger size.

A display system (10) of a sixth aspect would be realized in combination with the fifth aspect. In the sixth aspect, the maximum amount of sag (S10) of the first reflective surface (121a) is a maximum amount of sag in a length direction of the first reflective surface (121a) and is given by a distance, along an optical axis (X10) of the first reflective surface (121a), between a position (P10) on the optical axis (X10) of the first reflective surface (121a) and a position (P11) farthest from the optical axis (X10) of the first reflective surface (121a) within the first reflective surface (121a). The maximum amount of sag (S20) of the second reflective surface (122a) is a maximum amount of sag in a length direction of the second reflective surface (122a) and is given by a distance, along an optical axis (X20) of the second reflective surface (122a), between a position (P20) on the optical axis (X20) of the second reflective surface (122a) and a position (P21) farthest from the optical axis (X20) of the second reflective surface (122a) within the second reflective surface (122a). The sixth aspect enables downsizing yet a virtual image (310) can have a larger size.

A display system (10) of a seventh aspect would be realized in combination with any one of the first to sixth aspects. In the seventh aspect, a display distance (D) defined as a distance between the point of view position (P200) and the available area (300) for display of the virtual image (310) is equal to or larger than 7 [m]. The seventh aspect enables downsizing yet a virtual image (310) can have a larger size.

A display system (10) of an eighth aspect would be realized in combination with the seventh aspect. In the eighth aspect, the display distance (D) is equal to or larger than 10 [m]. The eighth aspect enables downsizing yet a virtual image (310) can have a larger size.

A display system (10) of a ninth aspect would be realized in combination with any one of the first to eighth aspects. In the ninth aspect, the first reflective surface (121a) includes a convex surface. The ninth aspect enables downsizing yet a virtual image (310) can have a larger size.

A display system (10) of a tenth aspect would be realized in combination with any one of the first to ninth aspects. In the tenth aspect, the second reflective surface (122a) includes a concave surface. The tenth aspect enables downsizing yet a virtual image (310) can have a larger size.

A movable object (100) of an eleventh aspect includes: a movable object body (100a); and the display system (10) of any one of the first to tenth aspects installed in the movable object body (100a). The eleventh aspect enables downsizing yet a virtual image (310) can have a larger size.

A display system (10) of a twelfth aspect includes: a display unit (110); a first optical member (121); and a second optical member (122). The display unit (110) includes a display surface (110a) for displaying an image. The first optical member (121) including a first reflective surface (121a) for reflecting rays of light constituting the image. The second optical member (122) includes a second reflective surface (122a) for reflecting rays of light reflected from the first reflective surface (121a) to form a virtual image (310) in a target space (400). An angle of view in a length direction of an available area (300) for display of the virtual image (310) with regard to a point of view position (P200) for the virtual image (310) is denoted by θ [deg]. A maximum amount of sag of the first reflective surface (121a) is denoted by S10 [mm]. A maximum amount of sag of the second reflective surface (122a) is denoted by S20 [mm]. A square root of sum of squares of S10 and S20 is denoted by S. S is equal to or larger than 4.0×θ−9.2 and is equal to or smaller than 6.0×θ−13.8. θ is equal to or greater than 8.0. The twelfth aspect enables downsizing yet a virtual image (310) can have a larger size.

A display system (10) of a thirteenth aspect would be realized in combination with the twelfth aspect. In the thirteenth aspect, the maximum amount of sag (S10) of the first reflective surface (121a) is a maximum amount of sag in a length direction of the first reflective surface (121a) and is given by a distance, along an optical axis (X10) of the first reflective surface (121a), between a position (P10) on the optical axis (X10) of the first reflective surface (121a) and a position (P11) farthest from the optical axis (X10) of the first reflective surface (121a) within the first reflective surface (121a). The maximum amount of sag (S20) of the second reflective surface (122a) is a maximum amount of sag in a length direction of the second reflective surface (122a) and is given by a distance, along an optical axis (X20) of the second reflective surface (122a), between a position (P20) on the optical axis (X20) of the second reflective surface (122a) and a position (P21) farthest from the optical axis (X20) of the second reflective surface (122a) within the second reflective surface (122a). The thirteenth aspect enables downsizing yet a virtual image (310) can have a larger size.

A display system (10) of a fourteenth aspect would be realized in combination with the twelfth or thirteenth aspect. In the fourteenth aspect, θ is equal to or larger than 9.0. The fourteenth aspect enables downsizing yet a virtual image (310) can have a larger size.

A display system (10) of a fifteenth aspect would be realized in combination with any one of the twelfth to fourteenth aspects. In the fifteenth aspect, θ is equal to or smaller than 14.0. The fifteenth aspect enables downsizing yet a virtual image (310) can have a larger size.

A display system (10) of a sixteenth aspect would be realized in combination with any one of the twelfth to fifteenth aspects. In the sixteenth aspect, a display distance (D) defined as a distance between the point of view position (P200) and the available area (300) for display of the virtual image (310) is equal to or larger than 7 [m]. The sixteenth aspect enables downsizing yet a virtual image (310) can have a larger size.

A display system (10) of a seventeenth aspect would be realized in combination with the sixteenth aspect. In the seventeenth aspect, the display distance (D) is equal to or larger than 10 [m]. The seventeenth aspect enables downsizing yet a virtual image (310) can have a larger size.

A display system (10) of an eighteenth aspect would be realized in combination with any one of the twelfth to seventeenth aspects. In the eighteenth aspect, the first reflective surface (121a) includes a convex surface. The eighteenth aspect enables downsizing yet a virtual image (310) can have a larger size.

A display system (10) of a nineteenth aspect would be realized in combination with any one of the twelfth to eighteenth aspects. In the nineteenth aspect, the second reflective surface (122a) includes a concave surface. The nineteenth aspect enables downsizing yet a virtual image (310) can have a larger size.

A movable object (100) of a twentieth aspect includes: a movable object body (100a); and the display system (10) of any one of the twelfth to nineteenth aspects installed in the movable object body (100a). The twentieth aspect enables downsizing yet a virtual image (310) can have a larger size.

While various embodiments have been described herein above, it is to be appreciated that various changes in form and detail may be made without departing from the spirit and scope of the present disclosure presently or hereafter claimed.

The entire contents of Japanese Patent Application No. 2017-202076 mentioned above are incorporated by reference.

The invention claimed is:

1. A display system comprising:
    a display unit including a display surface for displaying an image;
    a first optical member including a first reflective surface for reflecting rays of light constituting the image; and
    a second optical member including a second reflective surface for reflecting rays of light reflected from the first reflective surface to form a virtual image in a target space,
    an angle of view in a length direction of an available area for display of the virtual image with regard to a point of view position for the virtual image being denoted by θ [deg],
    a length of the display surface being denoted by W [mm],
    W being equal to or greater than a prescribed value given by 12.0×θ−26.6, and
    θ being equal to or greater than 8.0.

2. The display system according to claim 1, wherein W is 1.1 times as large as the prescribed value or less.

3. The display system according to claim 1, wherein θ is equal to or larger than 9.0.

4. The display system according to claim 1, wherein θ is equal to or smaller than 14.0.

5. The display system according to claim 1, wherein:
a maximum amount of sag of the first reflective surface is denoted by S10 [mm];
a maximum amount of sag of the second reflective surface is denoted by S20 [mm];
a square root of sum of squares of S10 and S20 is denoted by S; and
S is equal to or larger than 4.0×θ−9.2 and is equal to or smaller than 6.0×θ−13.8.

6. The display system according to claim 5, wherein:
the maximum amount of sag of the first reflective surface is a maximum amount of sag in a length direction of the first reflective surface and is given by a distance, along an optical axis of the first reflective surface, between a position on the optical axis of the first reflective surface and a position farthest from the optical axis of the first reflective surface within the first reflective surface; and
the maximum amount of sag of the second reflective surface is a maximum amount of sag in a length direction of the second reflective surface and is given by a distance, along an optical axis of the second reflective surface, between a position on the optical axis of the second reflective surface and a position farthest from the optical axis of the second reflective surface within the second reflective surface.

7. The display system according to claim 1, wherein a display distance defined as a distance between the point of view position and the available area for display of the virtual image is equal to or larger than 7 [m].

8. The display system according to claim 7, wherein the display distance is equal to or larger than 10 [m].

9. The display system according to claim 1, wherein the first reflective surface includes a convex surface.

10. The display system according to claim 1, wherein the second reflective surface includes a concave surface.

11. A movable object comprising:
a movable object body; and
the display system according to claim 1 installed in the movable object body.

12. A display system comprising:
a display unit including a display surface for displaying an image;
a first optical member including a first reflective surface for reflecting rays of light constituting the image; and
a second optical member including a second reflective surface for reflecting rays of light reflected from the first reflective surface to form a virtual image in a target space,
an angle of view in a length direction of an available area for display of the virtual image with regard to a point of view position for the virtual image being denoted by θ [deg],
a maximum amount of sag of the first reflective surface being denoted by S10 [mm],
a maximum amount of sag of the second reflective surface being denoted by S20 [mm],
a square root of sum of squares of S10 and S20 being denoted by S,
S is equal to or larger than 4.0×θ−9.2 and is equal to or smaller than 6.0×θ−13.8, and
θ being equal to or greater than 8.0.

13. The display system according to claim 12, wherein:
the maximum amount of sag of the first reflective surface is a maximum amount of sag in a length direction of the first reflective surface and is given by a distance, along an optical axis of the first reflective surface, between a position on the optical axis of the first reflective surface and a position farthest from the optical axis of the first reflective surface within the first reflective surface; and
the maximum amount of sag of the second reflective surface is a maximum amount of sag in a length direction of the second reflective surface and is given by a distance, along an optical axis of the second reflective surface, between a position on the optical axis of the second reflective surface and a position farthest from the optical axis of the second reflective surface within the second reflective surface.

14. The display system according to claim 12, wherein θ is equal to or larger than 9.0.

15. The display system according to claim 12, wherein θ is equal to or smaller than 14.0.

16. The display system according to claim 12, wherein a display distance defined as a distance between the point of view position and the available area for display of the virtual image is equal to or larger than 7 [m].

17. The display system according to claim 16, wherein the display distance is equal to or larger than 10 [m].

18. The display system according to claim 12, wherein the first reflective surface includes a convex surface.

19. The display system according to claim 12, wherein the second reflective surface includes a concave surface.

20. A movable object comprising:
a movable object body; and
the display system according to claim 12 installed in the movable object body.

* * * * *